(12) United States Patent
Wang

(10) Patent No.: US 10,355,780 B2
(45) Date of Patent: Jul. 16, 2019

(54) INTENSITY-MODULATED DIRECT DETECTION WITH MULTI-CHANNEL MULTI-BEAMING

(71) Applicant: Facebook, Inc., Menlo Park, CA (US)

(72) Inventor: Shih-Cheng Wang, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/828,338

(22) Filed: Nov. 30, 2017

(65) Prior Publication Data

US 2018/0102844 A1  Apr. 12, 2018

Related U.S. Application Data

(63) Continuation of application No. 14/984,173, filed on Dec. 30, 2015, now Pat. No. 9,866,320.

(51) Int. Cl.
*H04L 1/00* (2006.01)
*H04L 1/06* (2006.01)
(Continued)

(52) U.S. Cl.
CPC ....... *H04B 10/112* (2013.01); *H04B 10/1121* (2013.01); *H04B 10/1129* (2013.01);
(Continued)

(58) Field of Classification Search
CPC .............................................. H04B 10/11–118
See application file for complete search history.

(56) References Cited

U.S. PATENT DOCUMENTS

| 4,521,075 A | 6/1985 | Obenschain et al. |
| 5,339,177 A | 8/1994 | Jenkins et al. |

(Continued)

FOREIGN PATENT DOCUMENTS

| EP | 2 838 217 A1 | 2/2015 |
| JP | 2013-535871 A | 9/2013 |

(Continued)

OTHER PUBLICATIONS

U.S. Appl. No. 14/984,093 by K. Birbaum, filed Dec. 30, 2015, 40 pages.

(Continued)

*Primary Examiner* — Casey L Kretzer
(74) *Attorney, Agent, or Firm* — FisherBroyles, LLP

(57) ABSTRACT

Optical communication systems and methods using coherently combined optical beams are disclosed. A representative system includes a first data source for sending first data at a first frequency of a first optical beam to a first aperture, and at a second frequency of a second optical beam to a second aperture. The system further includes a second data source for sending second data at a third frequency of a third optical beam to the first aperture, and at a fourth frequency of a fourth optical beam to the second aperture. The system also includes a first interleaver of the first aperture configured to interleave the first data at the first frequency and the second data at the third frequency; and a second interleaver of the second aperture configured to interleave the first data at the second frequency and the second data at fourth frequency.

21 Claims, 4 Drawing Sheets

(51) Int. Cl.
*H04B 10/50* (2013.01)
*H04J 14/02* (2006.01)
*H04L 7/033* (2006.01)
*H04B 10/112* (2013.01)

(52) U.S. Cl.
CPC .......... *H04B 10/501* (2013.01); *H04J 14/02* (2013.01); *H04L 1/00* (2013.01); *H04L 1/06* (2013.01); *H04L 7/0331* (2013.01)

(56) References Cited

U.S. PATENT DOCUMENTS

| | | | |
|---|---|---|---|
| 6,097,861 A | 8/2000 | Kim et al. | |
| 6,731,878 B1 | 5/2004 | Britz et al. | |
| 6,807,375 B2 | 10/2004 | Dogariu | |
| 7,643,754 B2 | 1/2010 | Futami et al. | |
| 7,920,794 B1 | 4/2011 | Whaley et al. | |
| 2002/0126479 A1 | 9/2002 | Zhai et al. | |
| 2004/0052535 A1 | 3/2004 | Nohara et al. | |
| 2004/0239946 A1 | 12/2004 | Kane et al. | |
| 2005/0196170 A1 | 9/2005 | Winsor | |
| 2006/0078251 A1* | 4/2006 | Ducellier | G02B 6/12011 385/16 |
| 2006/0088319 A1* | 4/2006 | Morton | H04B 10/506 398/79 |
| 2008/0002986 A1 | 1/2008 | Izumi | |
| 2009/0324243 A1* | 12/2009 | Neilson | H04Q 11/0005 398/154 |
| 2010/0053474 A1 | 3/2010 | Kamei | |
| 2011/0164884 A1 | 7/2011 | Yamada et al. | |
| 2012/0008961 A1 | 1/2012 | Chen et al. | |
| 2012/0230685 A1 | 9/2012 | Jung et al. | |
| 2012/0237211 A1* | 9/2012 | Iizuka | H04B 10/611 398/26 |
| 2014/0029941 A1 | 1/2014 | Bratkovski et al. | |
| 2015/0229409 A1* | 8/2015 | Chen | H04B 10/6161 398/208 |
| 2016/0191195 A1* | 6/2016 | Magri | H04J 14/02 398/79 |
| 2017/0195057 A1 | 7/2017 | Birnbaum | |

FOREIGN PATENT DOCUMENTS

| | | |
|---|---|---|
| KR | 10-2014-0075861 A | 6/2014 |
| WO | 2005/002102 A1 | 1/2005 |
| WO | 2005/119942 A2 | 12/2005 |

OTHER PUBLICATIONS

Non-Final Office Action received for U.S. Appl. No. 14/984,093 dated Feb. 24, 2017, 45 pages.
International Search Report and Written Opinion received for International Patent Application Serial No. PCT/US2016/069019 dated Apr. 17, 2017, 9 pages.
International Search Report and Written Opinion received for International Application Serial No. PCT/US2016/069033 dated Apr. 17, 2017, 9 pages.
Yahya et al., "Transmit optics analysis for Free Space Optics improvements", 2011 IEEE International RF and Microwave Conference (RFM 2011), Dec. 12-14, 2011, pp. 262-265.
Notice of Allowance received for U.S. Appl. No. 14/984,093 dated Oct. 3, 2017, 16 pages.
Non-Final Office Action received for U.S. Appl. No. 14/984,173 dated Dec. 2, 2016, 25 pages.
Notice of Allowance received for U.S. Appl. No. 14/984,173 dated Aug. 30, 2017, 14 pages.

* cited by examiner

INTENSITY-MODULATED DIRECT DETECTION WITH MULTI-CHANNEL MULTI-BEAMING

CROSS-REFERENCES TO RELATED APPLICATIONS

This application a continuation of U.S. patent application Ser. No. 14/984,173, filed on Dec. 30, 2015, the disclosure of which is hereby incorporated herein in its entirety by reference.

TECHNICAL FIELD

The disclosed embodiments generally relate to the field of optical communication, and more specifically to transmitting beams of light from multiple data sources into one or more apertures. In some embodiments, the beams of light are transmitted at different frequencies (i.e., using non-coherent transmission) through the atmosphere to reduce or eliminate the effects of signal fading caused by atmospheric turbulence.

BACKGROUND

Errors in optically transmitted data are caused by a number of different factors, including distortion of optical signals in the air. In free-space optical communications systems that propagate optical signals through air, turbulence can be a significant source of channel impairment. For example, anomalous refraction of an optical beam (e.g., scintillation) can be caused by small-scale fluctuations in air density that result from temperature or pressure gradients along the path of the optical beam. These atmospheric fluctuations can cause frequency-nonselective fades in the optical beam's power. The fade process has a correlation time which is typically much longer than the duration of a typical symbol in the optical beam, therefore reducing the signal-to-noise ratio of the data stream.

To reduce the effects of optical beam fading, some conventional technologies apply channel equalization and forward error correction (FEC) coding at the physical layer. Channel equalization is used to reduce the inter-symbol interference that is induced by band-limiting in the receiver or channel. Forward error correction at the physical layer introduces a structured redundancy on the transmitted symbol sequence that can be exploited at the receiver to correct errors in recovering the transmitted data due to channel impairments. However, the complexity associated with encoding and decoding a physical layer with a FEC code increases with the length of the codeword. For example, in high data rate systems, a codeword should span multiple channel coherence times to enable recovery of the symbols lost due to optical beam fading. However, such a codeword would be prohibitively complex to handle in many practical situations.

With other conventional technologies, lost data may be retransmitted from a transmitter to a receiver upon detecting data loss (e.g., a dropped data frame). However, in many cases, the additional round-trip latency caused by the re-transmission requests and the need for an additional feedback channel make these technologies impractical or undesirable.

Another conventional approach to mitigate fading relies on spatial diversity. Since turbulence has a transverse correlation length $r_0$, if two optical source beams are separated by a distance D, then their fades will become statistically independent when $D \gg r_0$. Therefore, turbulence-induced errors in the optical beam (e.g., scintillation) are sufficiently non-correlated for optical beams that are spaced sufficiently apart. A conventional technology that utilizes spatial diversity to mitigate turbulence is called multi-beaming. The multi-beaming technique includes sending the same symbol along different paths separated by D, where $D \gg r_0$, such that different paths experience statistically independent fades and phase offsets. In this scenario, the total received signal intensity is the sum of several independent optical beams, each characterized by independent fading processes. As a result, the total received signal will thus have a smaller optical beam fading. However, this approach is only suitable when information is encoded by intensity, but is not applicable when the optical phase carries information. Accordingly, there remains a need for improved technique for the transmission of optical data at high data rates and low latency of the data transmission.

DETAILED DESCRIPTION

Figure 1:
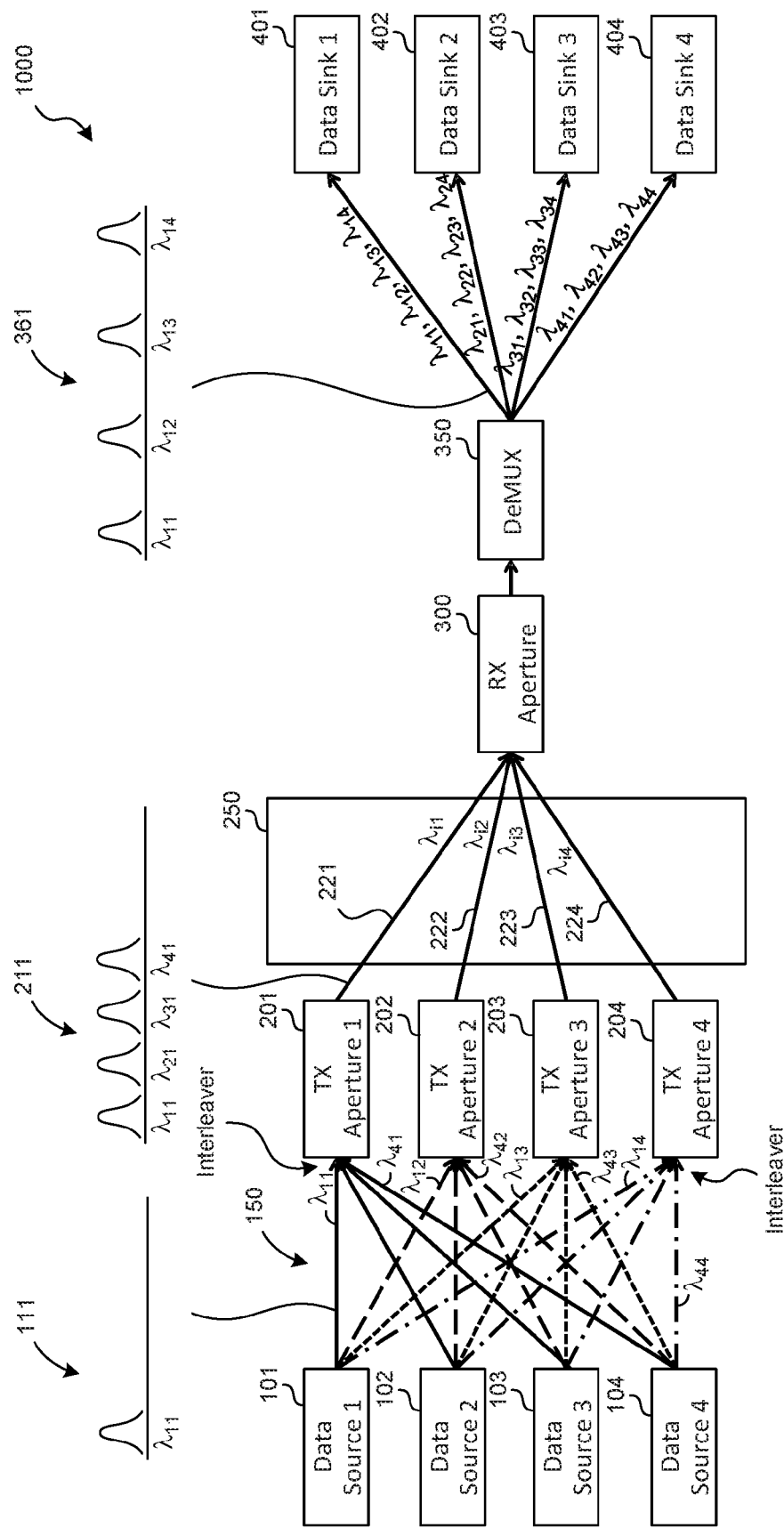
FIG. 1 is a schematic diagram illustrating a system for transmitting optical data transmission through the atmosphere in accordance with various embodiments.

Embodiments are directed to non-coherent combining light beams emitted by multiple data sources and received by multiple transmitting (TX) apertures. The received data-carrying optical beams may be non-coherently combined at their respective TX apertures because the optical beams have different wavelengths, frequencies, phases, or polarization angles. The combined optical beams can be sent through the atmosphere to a receiving (RX) aperture. Because the combined optical beams arrived to the RX aperture along paths having statistically uncorrelated turbulence the optical beams may also have statistically uncorrelated signal fading, therefore improving signal-to-noise ratio of the optical beams reconstructed at the RX aperture. In some embodiments, the optical beams at individual TX apertures can be combined using an optical multiplexer (MUX) and dense wavelength division multiplexing (DWDM), resulting in improved data throughput from the TX apertures to the RX aperture.

Briefly described, various embodiments use arrangements for non-coherently sending optical beams from multiple (e.g., two or more) TX apertures to one or more RX apertures. For example, a first data source may send multiple optical beams at different frequencies, wavelengths, phases or polarization angles to the corresponding TX apertures through optical fiber or the atmosphere. The multiple optical beams emitted by the first data source may carry same data. A second data source can also send data to the same set of TX apertures using multiple optical beams at another set of frequencies, wavelengths, phases or polarization angles. More data sources may similarly be employed to, for example, match the number of data sources to the number of the TX apertures. Therefore, in some embodiments, each TX aperture combines the incoming data from several data sources at different frequencies, and sends the data to a receiving (RX) aperture. In some embodiments, the optical beams propagate from the TX apertures to the RX aperture through the atmosphere over relatively long distances (e.g., kilometer scale), and are therefore exposed to scintillating effects of the turbulence. However, in at least some embodiments, the optical beams originating from different TX apertures may be spatially separated enough to be exposed to statistically non-correlated optical fading effects. Therefore, combining the optical light beams that carry the same data from different TX apertures along different paths may reduce the optical fading effects (e.g., the symbol loss).

In some embodiments, an interleaver (a multiplexer or MUX) at the TX aperture may interleave the optical beams arriving from multiple data sources based on, e.g., first-in-first-out (FIFO) method. In some embodiments, routing data from multiple data sources to multiple TX apertures may create timing inaccuracies among the optical beams arriving to the TX aperture or among the TX apertures, because of, for example, different paths of the optical beams. Therefore, in at least some embodiments, data rates can be synchronized using FIFOs (e.g., for a coarse adjustment) and phase-locked-loops (PLLs) (e.g., for a fine adjustment). The TX apertures may combine several frequencies of light that correspond to the frequencies of light sent by the data sources. In some embodiments, the TX apertures may use dense wavelength division multiplexing (DWDM) to combine optical beams and to send data to the RX aperture at a higher data rate.

FIG. 1 is a schematic diagram illustrating optical data transmission through the atmosphere in accordance with various embodiments. In the illustrated system 1000, TX apertures 201-204 combine data from four data sources 101-104, and send optical beams through the atmosphere 250 to an RX aperture 300. In some embodiments, each of the four data sources 101-104 sends data-carrying optical beams 150 to the TX apertures 201-204. For example, the TX aperture 203 receives optical beams at wavelengths $\lambda_{13}$ from data source 101, $\lambda_{23}$ from data source 102, $\lambda_{33}$ from data source 103, and $\lambda_{43}$ from data source 104. In the illustrated example, each TX aperture receives data from four data sources, but other combinations of the data sources and the TX apertures are also possible. For example, the number of the TX apertures may be greater than the number of the data sources for additional reduction of data fading caused by turbulence. In at least some embodiments, the optical beams 150 can be generated by lasers or light emitting diodes (LEDs), and may be transferred to the TX apertures 201-204 through the atmosphere or optical fiber. In some embodiments, the optical beams 150 propagate over a relatively short distance (e.g., less than several meters) from the data sources 101-104 to the TX apertures 201-204.

In some embodiments, the optical beams 150 are multiplexed at the TX apertures 201-204 before sending the multiplexed optical beams 221-224 through the atmosphere 250. For example, the TX aperture 202 may multiplex optical beams at wavelengths $\lambda_{12}$ from data source 101, $\lambda_{22}$ from data source 102, $\lambda_{32}$ from data source 103, and $\lambda_{42}$ from data source 104, and then send a combined optical beam 222 at wavelengths $\lambda_{12}$-$\lambda_{42}$ through the atmosphere 250 to the RX aperture 300. An example of a set of optical beam frequencies (in THz) for a sample combination of data sources and apertures is shown in Table 1 below.

TABLE 1

| Aperture | Data Source | | | |
|---|---|---|---|---|
| | 1 | 2 | 3 | 4 |
| 1 | 194.4 | 194.35 | 194.3 | 194.25 |
| 2 | 194.2 | 194.15 | 194.1 | 194.05 |
| 3 | 194.0 | 193.95 | 193.9 | 193.85 |
| 4 | 193.8 | 193.75 | 193.7 | 193.65 |

For the embodiment illustrated in Table 1, the frequencies of the optical beams emitted by the same data source are 50 MHz apart. For example, the data source 1 (e.g., data source 101 in FIG. 1) can emit four optical beams in the range of 193.8-194.4 THz, with the difference between adjacent frequencies being 0.2 THz or 200 MHz. As explained above, in at least some embodiments, the data source 101 sends the same data on the four optical beams (e.g., the wavelength $\lambda_{11}$ of a waveform 111 sent to TX aperture 201). In the embodiment illustrated in Table 1, the aperture 2 can receive data from data source 1 at 194.2 THz, from data source 2 at 194.15 THz, from data source 3 at 194.1 THz, and from data source 4 at 194.05 THz. Therefore, the frequencies of the four optical beams received by the aperture 2 are 0.05 THz or 50 MHz apart. In at least some embodiments, the different frequencies of the optical beams enable combining the optical beams (and the symbols embedded in the optical beams) using, for example, DWDM before sending the combined beam from any of the TX apertures to the RX aperture. For the example illustrated in Table 1, the frequency offset for the DWDM for any of the apertures is 50 MHz (i.e., four optical beams offset by 50 MHZ for a total frequency spectrum of 200 MHz allocated per an aperture). Other combinations of the numbers of apertures and data sources, and their corresponding frequencies are possible.

The TX apertures 201-204 may send their corresponding optical beams 221-224 to the RX aperture 300. As explained above, each optical beam 221-224 may include multiple optical beams at different wavelengths that are wavelength-division multiplexed, and sent along the same path to the RX aperture 300 (e.g., a set of wavelengths $\lambda_{11}$, $\lambda_{21}$, $\lambda_{31}$ and $\lambda_{41}$ in a waveform 211 sent from TX aperture 201). For example, the aperture 4 may emit the optical beam 224 that combines four wavelengths: $\lambda_{14}$, $\lambda_{24}$, $\lambda_{34}$ and $\lambda_{44}$ from the optical beams received from the four data sources 101-104. Using the example illustrated in Table 1, the data source 4 would emit a wavelength-division multiplexed optical beam that includes the frequencies 193.8 THz, 193.75 THz, 193.7 THz and 193.65 THz. In at least some embodiments, the optical beams 221-224 may be sufficiently apart such that they experience a statistically uncorrelated beam fading. As a result, the incidence of symbol loss due to beam fading may be reduced. In some embodiments, a distance between the RX aperture and the TX apertures may be several hundred meters or several kilometers.

In some embodiments, the RX aperture 300 sends the received optical beams 221-224 to a deinterleaver (deMUX) 350 through, for example, an optical fiber. In some embodiments, the deinterleaver 350 may deinterleave the optical beams 221-224 back to or close to the frequencies/wavelengths of the optical beams 150 sent by the data sources 101-104 (e.g., $\lambda_{11}$-$\lambda_{44}$). The deinterleaver 350 can route the deinterleaved optical beams to data sinks 401-404 through optical fiber or the atmosphere. For example, in one embodiment, the deinterleaver 350 can send optical beams using a set of wavelengths $\lambda_{11}$, $\lambda_{12}$, $\lambda_{13}$ and $\lambda_{14}$ in in a waveform 361 to the data sink 401. Additionally, the deinterleaver 350 can send optical beams to the data sink 403 at the wavelengths $\lambda_{31}$, $\lambda_{32}$, $\lambda_{33}$ and $\lambda_{34}$. As a result, in the illustrated embodiment, the data sink 403 receives the data sent from the data source 103. As explained above, if the optical beams 221-224 are spaced apart enough to experience statistically uncorrelated fading, then the optical beams received by the data sink 403 at the wavelengths $\lambda_{31}$, $\lambda_{32}$, $\lambda_{33}$ and $\lambda_{34}$ may be summed (or otherwise combined) to reduce or eliminate the symbol loss caused by the optical beam fade. Analogously, the data sinks 401, 402 and 404 may receive the optical beams that were sent by the data sources 101, 102 and 104, respectively. The deinterleaving of the optical beams in the deMUX 350 is described in more detail with reference to FIG. 2 below.

Figure 2:
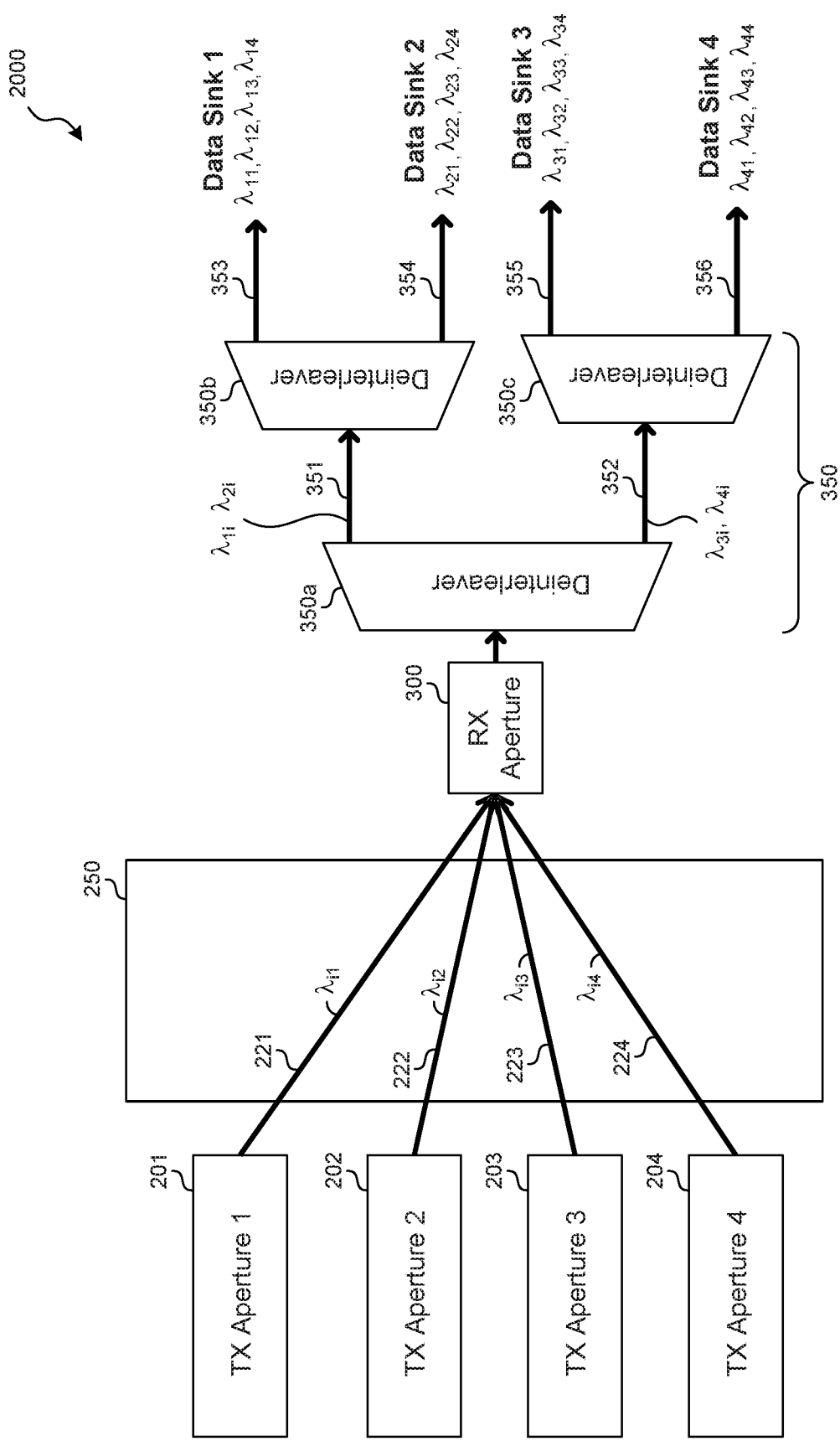
FIG. 2 is a schematic diagram illustrating a system for transmitting optical data by deinterleaving at a receiver (RX) in accordance with various embodiments.

FIG. 2 is a schematic diagram illustrating optical data deinterleaving at the receiver (RX) in accordance with various embodiments. In the illustrated embodiment, the TX apertures 201-204 send combined optical beams 221-224 to the RX aperture 300. In some embodiments, each optical beam 221-224 may be generated using a MUX that applies DWDM on the optical beams received from the data sources. The RX aperture 300 may send the received combined optical beams 221-224 to the deinterleaver (deMUX) 350. In some embodiments, the deinterleaver 350 may include multiple stages, e.g., a deinterleaver 350a in the first stage and deinterleavers 350b and 350c in the second stage. For example, the deinterleaver 350 may deinterleave the incoming optical beams into two optical beams: an optical beam 351 that includes optical beams sent from data sources 101 and 102, and an optical beam 352 that includes optical beams sent from data sources 103 and 104. In some embodiments, the optical beam 351 is received by the deinterleaver 350b in the second stage, and is further deinterleaved into two optical beams; an optical beam 353 that includes the optical beams sent from the data source 1 at the wavelengths $\lambda_{11}$, $\lambda_{12}$, $\lambda_{13}$ and $\lambda_{14}$, and an optical beam 354 that includes the optical beams sent from the data source 2 at the wavelengths $\lambda_{21}$, $\lambda_{22}$, $\lambda_{23}$ and $\lambda_{24}$. Analogously, the optical beam 352 may be deinterleaved into an optical beam 355 that includes the optical beams sent from the data source 3 at the wavelengths $\lambda_{31}$, $\lambda_{32}$, $\lambda_{33}$ and $\lambda_{34}$, and an optical beam 356 that includes the optical beams sent from the data source 4 at the wavelengths $\lambda_{41}$, $\lambda_{42}$, $\lambda_{43}$ and $\lambda_{44}$. Other combinations of deinterleaving the incoming optical beams are also possible. For example, in some embodiments a single deinterleaver may be used. In other embodiments, three or more stages of deinterleaving may be used.

Figure 3:
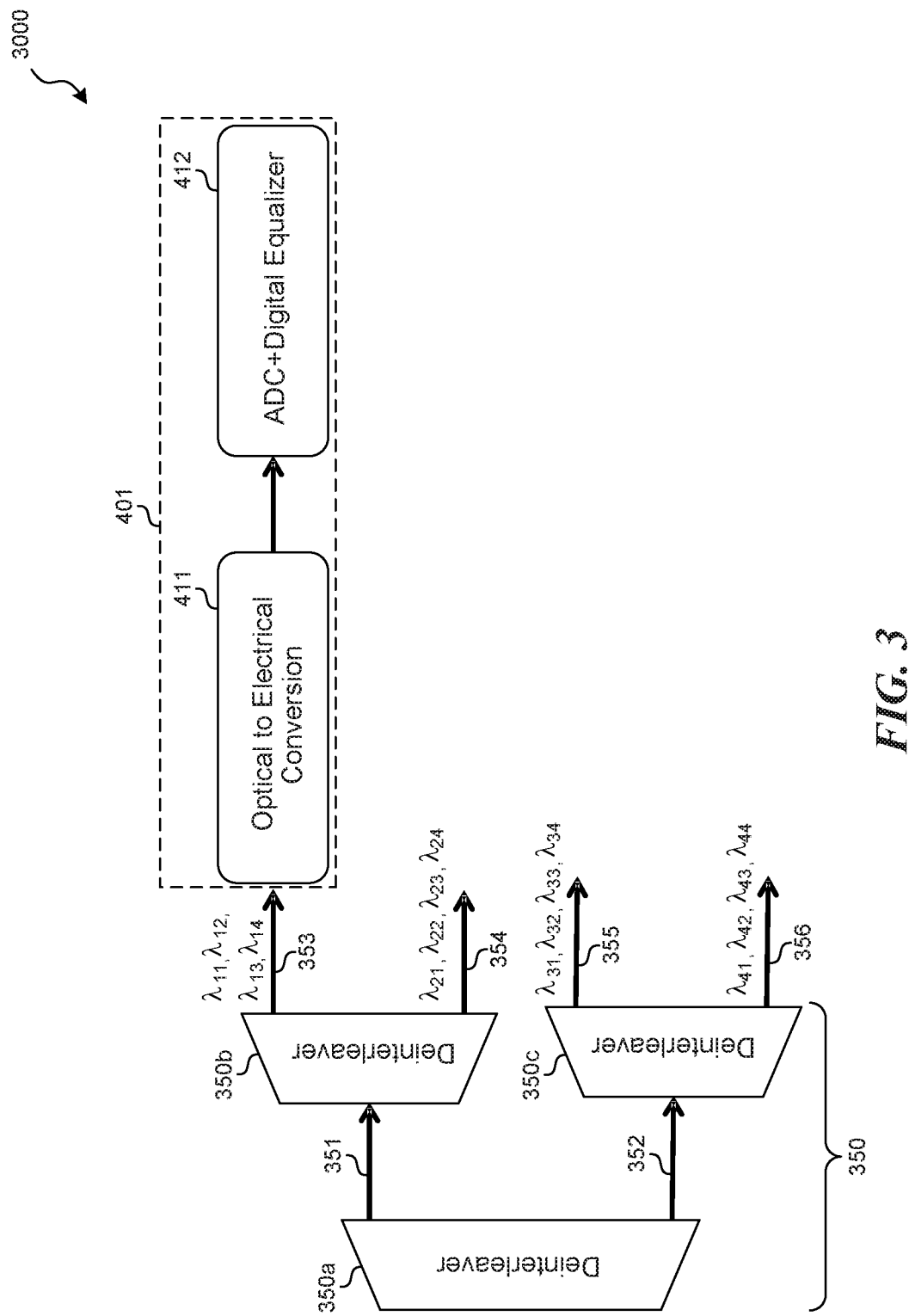
FIG. 3 is a schematic diagram of a system for converting optical data at the RX in accordance with various embodiments.

FIG. 3 is a schematic diagram illustrating optical data conversion at the RX in accordance with various embodiments. In some embodiments, the deinterleaver 350 may deinterleave the incoming optical beams into four optical beams 353-356, each respectively including the optical beams from one of the data sources 101-104. For example, the optical beam 353 may include four optical beams at the wavelengths $\lambda_{11}$, $\lambda_{12}$, $\lambda_{13}$ and $\lambda_{14}$ sent by the data source 101 and received by the data sink 401. The optical beam 353 may be converted to electrical signals in a converter 411 (e.g. a photo diode). For at least some DWDM schemes, the resulting electrical signals (e.g., corresponding to symbols in the optical beam) may be reconstructed as:

$$S(\lambda_1(t)) = S(\lambda_{11}(t)) + S(\lambda_{12}(t-\tau_2)) + S(\lambda_{13}(t-\tau_3)) + S(\lambda_{14}(t-\tau_4))$$ (Equation 1)

where $S(\lambda_1(t))$ is a reconstructed signal from the data source 101 corresponding to time t, $S(\lambda_{11}(t))$ is signal sent by the data source 101 at time t using wavelength $\lambda_{11}$, $S(\lambda_{12}(t-\tau_2))$ is a signal sent by the data source 101 at time t using wavelength $\lambda_{12}$, etc. Generally, the time offsets $\tau_2$, $\tau_3$ and $\tau_4$ can be selected to account for the interleaving time offsets of the DWDM schemes. Furthermore, the non-coherency of the optical beams (e.g., the light beams having different wavelengths) enables the transmission and summing of the optical beams at the receiver. In at least some embodiments, a sufficient spatial separation of the optical beams results in lower statistical coherence in optical beam fading that improves symbol recovery when the optical beams are combined using Equation 1. In at least some embodiments, a digital equalizer 412 may adjust amplitudes of the signals S.

Figure 4:
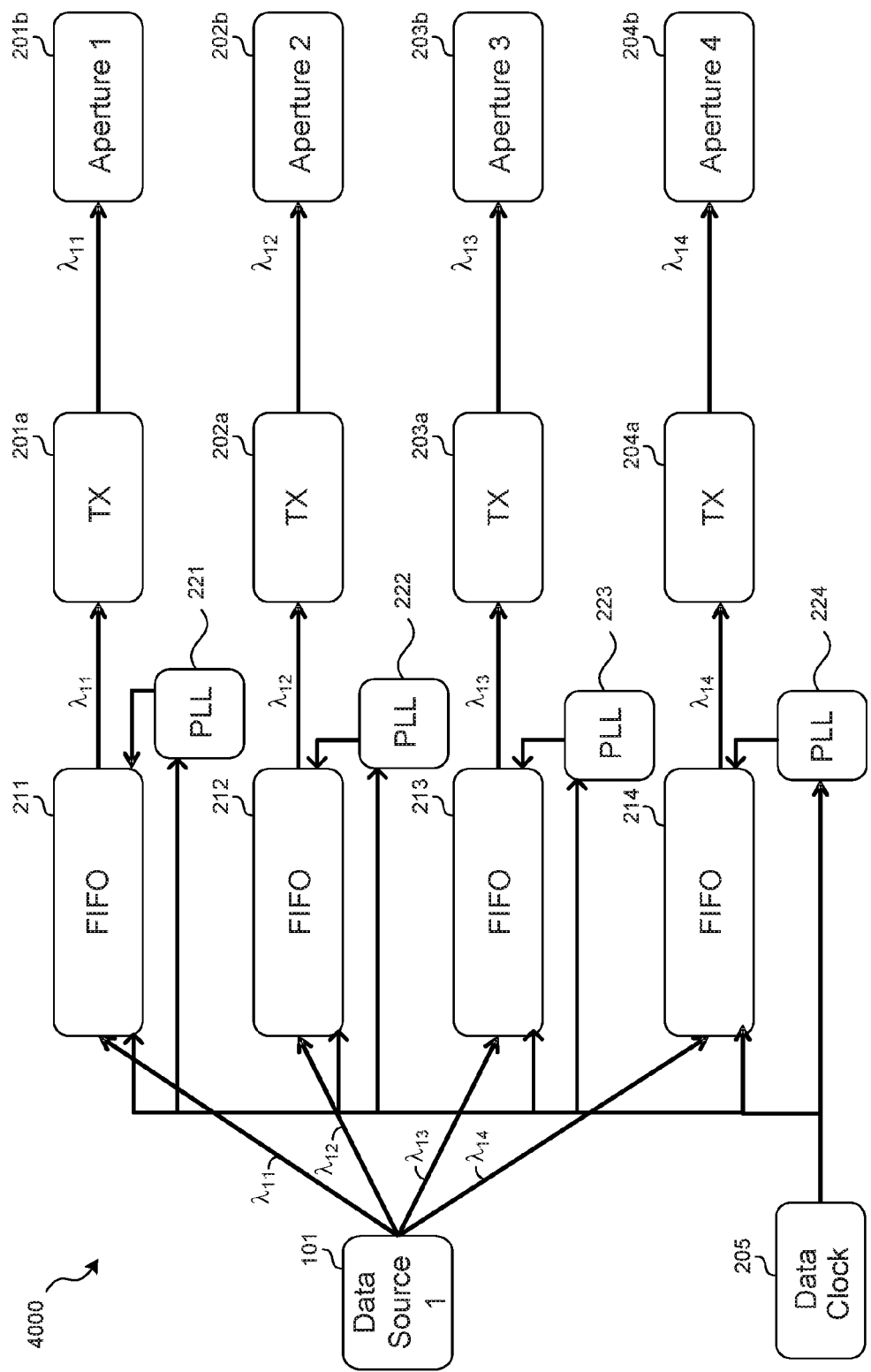
FIG. 4 is a schematic diagram of a system for compensating for delays at a transmitter (TX) in accordance with various embodiments.

FIG. 4 is a schematic diagram illustrating delay compensation at the transmitter (TX) in accordance with various embodiments. In some embodiments, routing the optical beams from the data sources to different TX apertures may result in uneven arrival times at the TX apertures. For example, one optical beam may travel over a longer distance and therefore be delayed with respect to another optical beam. In at least some embodiments, the delays of the optical beams may correspond to a fraction of a baud (symbol per second), therefore being difficult to adjust for using, for example, optical fiber splicing. In at least some embodiments, an electronic compensation may be used to reduce or eliminate the delays between the optical beams. In the illustrated system 4000, the data source 101 sends optical beams to FIFOs 211-214. In at least some embodiments, each FIFO can receive optical beams from additional data sources, e.g., from data sources 102-104. In some embodiments, the FIFOs may be connected to a common data clock 205 for synchronizing the operation of the FIFOs. For example, the common data clock 205 may clock data from data sources to the FIFOs, therefore providing at least a coarse synchronization of the optical beam arrival. In some embodiments, the PLLs 221-224 may provide a fine synchronization of the optical beam arrival by independently adjusting the phase of the optical beams interleaving to a sub-baud level. The synchronized interleaved optical beams from the data sources (only one data source is illustrated) may be sent to the TXs 201a-204a and the apertures 201b-204b. In at least some embodiments, the combination of the coarse and fine synchronization (adjustment) improves signal-to-noise ratio at the RX apertures. In some embodiments, the coarse synchronization may be used, while the fine synchronization is not used.

From the foregoing, it will be appreciated that specific embodiments of the invention have been described herein for purposes of illustration, but that various modifications may be made without deviating from the scope of the invention. For example, in some embodiments the optical beams may propagate through a vacuum, or a combination of air and vacuum. In some embodiments, the optical beams may have frequency that is not visible, for example, frequency higher than that of visible light. In some embodiments, multiple RX apertures may be used. For example, one RX aperture may receive optical beams from a subset of TX apertures, while the remaining optical beams are received by another RX aperture. Accordingly, the invention is not limited, except as by the appended claims.

The invention claimed is:

1. An optical transmitter, comprising:
   a first aperture;
   a second aperture;
   a first data source configured to:
      send a first optical beam at a first value of a property to the first aperture, the first optical beam comprising first data; and send a second optical beam at a second value of the property to the second aperture, the second optical beam comprising the same first data;
a second data source configured to:
send a third optical beam at a third value of the property to the first aperture, the third optical beam comprising second data; and
send a fourth optical beam at a fourth value of the property to the second aperture, the fourth optical beam comprising the same second data;
a first interleaver of the first aperture configured to combine the first optical beam at the first value and the third optical beam at the third value into a first combined optical beam to be sent from the first aperture; and
a second interleaver of the second aperture configured to interleave the second optical beam at the second value and the fourth optical beam at the fourth value into a second combined optical beam to be sent from the second aperture.

2. The optical transmitter of claim 1, wherein timing inaccuracies between the first data and the second data arriving at the first aperture and the second aperture are adjusted by at least one first-in-first-out (FIFO) element or at least one phase-locked-loop (PLL).

3. The optical transmitter of claim 2, wherein the at least one FIFO element or the at least one PLL are connected to a common clock.

4. The optical transmitter of claim 2, wherein the property of a respective optical beam includes at least one of: a frequency, a wavelength, a phase, or a polarization angle.

5. The optical transmitter of claim 2, wherein the at least one FIFO element is configured to perform a coarse adjustment of at least one optical beam included in the first optical beam, the second optical beam, the third optical beam, or the fourth optical beam.

6. The optical transmitter of claim 2, wherein the at least one PLL is configured to perform a fine adjustment of at least one optical beam included in the first optical beam, the second optical beam, the third optical beam, or the fourth optical beam.

7. The optical transmitter of claim 6, wherein the fine adjustment of the at least one optical beam includes independent adjustment of a phase of the at least one optical beam.

8. The optical transmitter of claim 1, wherein a combination of a fine adjustment of at least one optical beam and a coarse adjustment of the at least one optical beam improves a signal-to-noise ratio of the at least one optical beam, wherein the at least one optical beam is included in the first optical beam, the second optical beam, the third optical beam, or the fourth optical beam.

9. The optical transmitter of claim 1, wherein the property corresponds to a frequency, wherein the first value, the second value, the third value, and the fourth value are successively spaced apart by a constant offset.

10. The optical transmitter of claim 1, wherein the first aperture and the second aperture are spatially separated enough to cause the first combined optical beam and the second combined optical beam to experience statistically uncorrelated fading.

11. An optical receiver comprising:
a receive aperture to receive a first combined optical beam from a transmitter, wherein:
the first combined optical beam includes a second combined optical beam, a third combined optical beam, a fourth combined optical beam, and a fifth combined optical beam;
the second combined optical beam includes multiple optical beams each comprising same first data and having different values of a property;
the third combined optical beam includes multiple optical beams each comprising same second data and having different values of the property;
the fourth combined optical beam includes multiple optical beams each comprising same third data and having different values of the property;
the fifth combined optical beam includes multiple optical beams each comprising same fourth data and having different values of the property; and
a multi-stage deinterleaver configured to deinterleave the first combined optical beam into the second combined optical beam, the third combined optical beam, the fourth combined optical beam, and the fifth combined optical beam, the multi-stage deinterleaver comprising:
a first deinterleaver configured to:
receive the first combined optical beam from the receive aperture; and
deinterleave the first combined optical beam into a sixth combined optical beam and a seventh combined optical beam, wherein:
the sixth combined optical beam includes the second combined optical beam and the third combined optical beam; and
the seventh combined optical beam includes the fourth combined optical beam and the fifth combined optical beam;
a second deinterleaver configured to:
receive the sixth combined optical beam from the first deinterleaver;
deinterleave the sixth combined optical beam into the second combined optical beam and the third combined optical beam;
send the second combined optical beam to a first data sink; and
send the third combined optical beam to a second data sink; and
a third deinterleaver configured to:
receive the seventh combined optical beam from the first deinterleaver;
deinterleave the seventh combined optical beam into the fourth combined optical beam and the fifth combined optical beam;
send the fourth combined optical beam to a third data sink; and
send the fifth combined optical beam to a fourth data sink.

12. The optical receiver of claim 11, wherein the second combined optical beam, the third combined optical beam, the fourth combined optical beam, and the fifth combined optical beam are combined using dense wavelength division multiplexing (DWDM).

13. The optical receiver of claim 11, wherein the first data sink comprises: an optical to electrical conversion unit; an analog to digital conversion (ADC) unit; and a digital equalizer.

14. The optical receiver of claim 11, wherein the receive aperture is a first receive aperture, wherein a portion of the first combined optical beam is received at the first receive aperture, further comprising:

a second receive aperture to receive a remaining portion of the first combined optical beam.

15. The optical receiver of claim 11, wherein frequencies associated with the second combined optical beam, the third combined optical beam, the fourth combined optical beam, and the fifth combined optical beam in the first combined optical beam identically match or approximately match transmitted frequencies of the second combined optical beam, the third combined optical beam, the fourth combined optical beam, and the fifth combined optical beam.

16. An optical communication system, comprising:
an optical transmitter comprising:
a first data source configured to send first data—
at a first frequency of a first optical beam to a first aperture, and
at a second frequency of a second optical beam to a second aperture;
a second data source configured to send second data—
at a third frequency of a third optical beam to the first aperture, and
at a fourth frequency of a fourth optical beam to the second aperture;
a first interleaver of the first aperture configured to interleave the first data at the first frequency and the second data at the third frequency;
a second interleaver of the second aperture configured to interleave the first data at the second frequency and the second data at the fourth frequency; and
wherein timing inaccuracies between the first data and the second data arriving at the first aperture and the second aperture are adjusted by at least one first-in-first-out (FIFO) element or at least one phaselocked-loop (PLL).

17. The optical communication system of claim 16, wherein the at least one FIFO element or the at least one PLL are connected to a common clock.

18. The optical communication system of claim 16, wherein the at least one FIFO element is configured to perform a coarse adjustment of at least one optical beam included in the first optical beam, the second optical beam, the third optical beam, or the fourth optical beam.

19. The optical communication system of claim 16, wherein the at least one PLL is configured to perform a fine adjustment of at least one optical beam included in the first optical beam, the second optical beam, the third optical beam, or the fourth optical beam.

20. The optical communication system of claim 19, wherein the fine adjustment of the at least one optical beam includes independent adjustment of a phase of the at least one optical beam.

21. The optical communication system of claim 16, wherein a combination of a fine adjustment of at least one optical beam and a coarse adjustment of the at least one optical beam improves a signal-to-noise ratio of the at least one optical beam, wherein the at least one optical beam is included in the first optical beam, the second optical beam, the third optical beam, or the fourth optical beam.

* * * * *